United States Patent
Sun et al.

(10) Patent No.: US 10,305,605 B2
(45) Date of Patent: May 28, 2019

(54) OPTICAL RECEIVER, OPTICAL TRANSCEIVER COMPRISING THE SAME, AND METHOD OF PROTECTING A PHOTODETECTOR IN THE OPTICAL RECEIVER WITH A TRANSIENT EVENT OR A TRANSIENT STATE DETERMINATION

(71) Applicant: Source Photonics (Chengdu) Company Limited, Chengdu (CN)

(72) Inventors: Chaoyuan Sun, Chengdu (CN); Qi Peng, Chengdu (CN); Meiling Lu, Chengdu (CN)

(73) Assignee: Source Photonics (Chengdu) Co., Ltd., Chengdu (CN)

( * ) Notice: Subject to any disclaimer, the term of this patent is extended or adjusted under 35 U.S.C. 154(b) by 171 days.

(21) Appl. No.: 15/314,024

(22) PCT Filed: Nov. 18, 2016

(86) PCT No.: PCT/CN2016/106448
§ 371 (c)(1),
(2) Date: Nov. 25, 2016

(87) PCT Pub. No.: WO2018/090337
PCT Pub. Date: May 24, 2018

(65) Prior Publication Data
US 2018/0269987 A1    Sep. 20, 2018

(51) Int. Cl.
*H04B 10/032* (2013.01)
*H04B 10/69* (2013.01)
(Continued)

(52) U.S. Cl.
CPC ....... *H04B 10/6911* (2013.01); *H04B 10/032* (2013.01); *H04B 10/11* (2013.01); *H04B 10/40* (2013.01)

(58) Field of Classification Search
CPC ... H04B 10/032; H04B 10/40; H04B 10/6911
(Continued)

(56) References Cited

U.S. PATENT DOCUMENTS 7,196,309 B2    3/2007  Kugelstadt
7,265,333 B2 *  9/2007  Ichino ............... H01L 31/02027
                                                250/214 A
(Continued)

FOREIGN PATENT DOCUMENTS

| CN | 201256288 Y | 6/2009 |
| CN | 102013676 A | 4/2011 |
| CN | 106033225 A | 10/2016 |

OTHER PUBLICATIONS

Wang Xiangzhong; "Low-Power Consumption APD Bias Controller, Bias Control Method, and Photoelectric Receiver"; Bibliographic Data of CN106033225 (A); Oct. 19, 2016; http://worldwide.espacenet.com.

(Continued)

*Primary Examiner* — Que Tan Le
(74) *Attorney, Agent, or Firm* — Andrew D. Fortney; Central California IP Group, P.C.

(57) ABSTRACT

An optical or optoelectronic receiver, an optoelectronic transceiver including the same, and a method and system for protecting a photodetector in the same are disclosed. The method of protecting a photodetector generally includes providing a control voltage to the photodetector so that a current flows through the photodetector, and determining that a transient event has occurred or a transient state exists in the receiver. During the transient event or transient state, the method maintains the control voltage at a normal operating voltage when the current through the photodetector is at or below a predetermined threshold current, and switches the control voltage to a safe mode voltage when the current (Continued)

through the photodetector is above the predetermined threshold current.

20 Claims, 8 Drawing Sheets

(51) Int. Cl.
*H04B 10/11* (2013.01)
*H04B 10/40* (2013.01)

(58) Field of Classification Search
USPC .................................................. 250/214 R
See application file for complete search history.

(56) References Cited

U.S. PATENT DOCUMENTS

2005/0035275 A1 2/2005 Kugelstadt
2016/0273959 A1 9/2016 Wang

OTHER PUBLICATIONS

Tao Yu; "Protector and Protection Method of Avalanche Photodiode (APD)"; Bibliographic Data of CN102013676 (A); Apr. 13, 2011; http://worldwide.espacenet.com.
Qi Zhang; "Bias Protection Device and Circuit for Avalanche Photo Diode"; Bibliographic Data of CN201256288 (Y); Jun. 10, 2009; http://worldwide.espacenet.com.
International Search Report dated Aug. 24, 2017, PCT International Application No. PCT/CN2016/106448; 4 pgs.; State Intellectual Property Office of the People's Republic of China, Beijing, China.

\* cited by examiner

OPTICAL RECEIVER, OPTICAL TRANSCEIVER COMPRISING THE SAME, AND METHOD OF PROTECTING A PHOTODETECTOR IN THE OPTICAL RECEIVER WITH A TRANSIENT EVENT OR A TRANSIENT STATE DETERMINATION

FIELD OF THE INVENTION

The present invention relates to the field of optical communications, especially to optical receivers, optical and/or optoelectronic transceivers including the same, and methods of protecting the same.

DISCUSSION OF THE BACKGROUND

In optical communications, optical signals carry information. For example, a transmitter (e.g., a laser or laser diode) in an optical or optoelectronic transceiver converts one or more electrical signals into optical signals, and a receiver (e.g., a photodiode) in an optical or optoelectronic transceiver converts one or more optical signals into electrical signals. One objective of optical communication research and development is to increase and/or maximize bandwidth (e.g., the amount of information transmitted) to the greatest extent possible. Another objective is to communicate and receive the information as reliably as possible.

Typically, optical receivers for such optical signals include a photodiode (e.g., an avalanche photodiode, or APD). There are existing methods for protecting APDs from damage. According to theory, the primary cause of APD damage in practical use includes damage from high voltage (e.g., high $V_{apd}$) and damage from high current (e.g., high $I_{apd}$). Setting a control voltage $V_{opt}$ to an APD at the optimal sensitivity point can ensure that the APD operational voltage is small enough to avoid damage to the APD. High current in the APD (e.g., $I_{apd}$>2 mA) can cause permanent damage to the APD. As photodiodes generally have a quick response to light, current-limiting protection downstream from the photodiode cannot limit instant light-induced current, and current-limiting resistors generally limit changes in light-induced current by regulating $V_{apd}$.

FIG. 1 is a diagram showing a conventional circuit 10 for protecting an APD 22 in a receiver optical subassembly (ROSA) 20 in an optoelectronic receiver. In the circuit 10 as shown in FIG. 1, the microprocessor MCU 30 controls the maximum voltage to the APD 22 using a feedback signal 54 from a boost control circuit 40 and a current minor 50. A high voltage or current can be provided to the ROSA 20 from a first output 52 of the current mirror 50. The output 52 supplies a voltage to the APD 22 after filtering by two decoupling capacitors C1 and C2. As a result, the APD 22 receives a sufficient voltage to cause an avalanche and/or multiplier effect. The APD 22 then converts optical signals into electrical signals (which are output as the APD current $I_{apd}$), and a transimpedance amplifier (TIA) 60 converts the single-ended APD current $I_{apd}$ into a differential signal and shapes the differential signal into a data signal Data+/Data− that is received by a limiting amplifier 70. If the amplitude of the data signal Data+/Data− has an insufficient magnitude, the differential limiting amplifier 60 determines that the data signal Data+/Data− is lost, and it outputs an LOS (loss-of-signal) signal 75 having a state representing this condition. Another output 54 of the current minor 50 proportional to the current on the first output 52 generates a current sampling voltage across a sampling resistor R1 that is input at a receiver power sample input (e.g., RX power pin) to the MCU 30, and the receiver power is sampled by an analog-to-digital converter (ADC) in the MCU 30 and monitored by the MCU 30.

For optimum sensitivity, the MCU 30 controls the boost control circuit 40 such that the bias current 52 to the receiver APD 22 remains in an avalanche mode at or near a point where a multiplication factor of the APD 22 converts a relatively small light input to a relatively large current. However, when the bias input to the APD 22 is too large, the current flowing through the APD 22 is too large, and the APD 22 can be damaged.

FIG. 2 is a diagram showing an improvement to the circuit of FIG. 1, in which the current 52 at the first output terminal of the current mirror 50 is connected to a second resistor R2 having a resistance of, e.g., 10-100 kΩ. The resistance is relatively large when the strength of the optical signal received at the APD 22 increases. The resulting voltage drop across the second resistor R2 reduces the voltage to the APD 22, reducing the APD multiplication factor and the current $I_{apd}$, thereby protecting the APD 22.

FIG. 3 is a diagram showing exemplary communication paths or links in a system 100 for use in an optical network. For clarity, only the transmission (outbound) paths are shown. The system 100 includes a network-side optical or optoelectronic dual transceiver 110, a main host-side optical or optoelectronic transceiver 120, a reserved or duplicate host-side optical or optoelectronic transceiver 130, and an optical multiplexer/demultiplexer 140. The system 100 may operate or function as an optical switch, repeater and/or regenerator.

The network-side transceiver 110 receives first and second incoming optical signals 112 and 114 at first and second incoming data ports TI1 and TI2. The network-side transceiver 110 transmits the first and second optical signals 112 and 114 through ports TO/11 and TO21 to the main host-side transceiver 120 and duplicate optical signals 112' and 114' through ports TO12 and TO22 to the reserved or duplicate host-side transceiver 130. The main and reserved/duplicate host-side transceivers 120 and 130 respectively transmit optical signals 122 and 132 through respective ports OUT and OUT' to the optical multiplexer/demultiplexer 140. The optical signal 122 may be or comprise either the first or second optical signal 112 or 114, a combined version of the first and second incoming optical signals 112 and 114 (e.g., by wavelength division multiplexing), or a reframed or reformatted version of the first and/or second incoming optical signals 112 and 114 (e.g., having different overhead data/information, transmitted at a different rate and/or frequency, etc.). The optical signal 132 may be identical or substantially identical to the optical signal 122.

During normal operation, the links from ports TO11 and TO21 in the network-side transceiver 110 to the receiver ports RX1 and RX2 in the host-side transceiver 120 are operational, and the optical multiplexer/demultiplexer 140 outputs the optical signal 122 from the host-side transceiver 120 as the data signal OUT to the host. However, if one of the links from the network-side transceiver 110 to the host-side transceiver 120 fails, a redundant link from port TO12 or TO22 in the network-side transceiver 110 to the port RX1' or RX2' in the reserved or duplicate host-side transceiver 130 can be established, and the optical multiplexer/demultiplexer 140 can be instructed to output signal 132 from the reserved or duplicate host-side transceiver 130 in place of the signal transmitted over the failed link.

In one common implementation, the new link between the other transmitter and the receiver must be established within a predetermined time period (e.g., 50 ms), for example to avoid loss of the link and/or of significant amounts of data transmitted over the link. However, when switching from one transmitter to another, the power or signal strength of the optical signal received from the new transmitter may be significantly higher than the optical signal from the old transmitter. When the power or signal strength of the new optical signal exceeds a maximum threshold, the current in the APD of the new receiver may exceed a limit above which the APD may be damaged. The circuit 10 of FIG. 1 is generally unable to protect the APD against such excessive currents after switching to a new transmitter. The circuit 10' of FIG. 2 can protect the APD against changes in the optical power during periods of continuous operation, but due to a relatively slow response time, it cannot protect the APD against excessive currents after switching to a new transmitter.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

The present invention is intended to provide a method of protecting a photodetector in an optical or optoelectronic receiver, optical or optoelectronic receivers and transceivers configured to protect a photodetector therein, and systems including such optical or optoelectronic receivers and transceivers. The optical or optoelectronic receiver includes a photodetector such as a photodiode (e.g., an avalanche photodiode).

The method of protecting an optical or optoelectronic receiver generally comprises providing a control voltage to the photodetector (e.g., an avalanche photodiode) so that a current flows through the photodetector, and determining that a transient event has occurred or a transient state exists in the optical or optoelectronic receiver. During the transient event or transient state, the method maintains the control voltage at a normal operating voltage when the current through the photodetector is at or below a predetermined threshold current, and switching the control voltage to a safe mode voltage when the current through the photodetector is above the predetermined threshold current. When the control voltage is switched to a safe mode voltage, the method may further comprise switching the control voltage to the normal operating voltage when the current through the photodetector is at or below the predetermined threshold current.

In various embodiments, after determining that the transient event has occurred or the transient state exists, the method further comprises determining the current through the photodetector. For example, determining the current through the photodetector may comprise mirroring a current from a current mirror to the photodetector, and sampling the mirrored current. In one embodiment, sampling the mirrored current may comprise converting an analog value of the mirrored current to a digital value for processing by the controller.

In additional embodiments, the normal operating voltage results in the current through the photodetector being less than or equal to about 1 mA when an optical signal received by the photodetector has a power of 5 dBm or less. In alternative or additional embodiments, the safe mode voltage is less than or equal to half of the normal operating voltage (e.g., 25-50% of the normal operating voltage, 33-40% the normal operating voltage, or any other value or range of values therein). In some examples, the predetermined threshold current is less than or equal to 1.2 mA.

Another aspect of the present invention relates to an optical or optoelectronic receiver, comprising an optical or optoelectronic photodetector having a current therethrough, a current minor coupled to the current through the optical or optoelectronic photodetector, a voltage control circuit and a controller coupled to the voltage control circuit. The current minor also provides a mirrored current corresponding to the current through photodetector, and receives a control voltage. The voltage control circuit is configured to provide the control voltage to the current minor. The controller may be or comprise a microcontroller, microprocessor or signal processor, and is configured to (i) determine a value of the mirrored current and (ii) after a transient event has occurred or a transient state exists in the optical or optoelectronic receiver, select (a) a first value of the control voltage when the mirrored current is at or below a predetermined threshold current and (b) a second value of the control voltage when the mirrored current is above the predetermined threshold current. The second value is less than the first value.

In one embodiment, the photodetector comprises an avalanche photodiode. In further or alternative embodiments, the mirrored current is a duplicate or a multiple and/or divisor of the current through the optical or optoelectronic photodetector, or a substantial duplicate or multiple and/or divisor of the current through the optical or optoelectronic photodetector.

In further embodiments, the optical or optoelectronic receiver further comprises a filter connected between the current mirror and the optical or optoelectronic photodetector, a transimpedance amplifier (TIA) configured to amplify an electrical signal from the photodetector and/or convert the electrical signal from the photodetector to a differential signal, and/or a limiting amplifier configured to amplify the differential signal from the TIA.

In some embodiments, the controller samples the mirrored current and compares the value of the mirrored current to the predetermined threshold value. In further or alternative embodiments, the first value results in the current through the optical or optoelectronic photodetector being less than or equal to about 1 mA when an optical signal received by the optical or optoelectronic photodetector has a power of 5 dBm or less, and/or the predetermined threshold value is less than or equal to 1.2 mA.

In further embodiments, the controller may be configured to instruct the voltage control circuit to output a signal having or corresponding to the first or second value, and/or when the control voltage is the second value, the controller is further configured switch the control voltage to the first value when the mirrored current is at or below the predetermined threshold current.

Another aspect of the present invention relates to an optical or optoelectronic transceiver, comprising the present optical or optoelectronic receiver, an optical or optoelectronic transmitter configured to generate an outgoing optical signal, and a fiber adapter or connector configured to receive an optical fiber. The receiver receives an incoming optical signal, and the optical fiber providing the incoming optical signal and/or receiving the outgoing optical signal. The present invention may further relate to a system (such as an optical or optoelectronic module) that comprises a plurality of the present optical or optoelectronic receivers or transceivers.

The present optical or optoelectronic receiver and method protects the photodiode in the receiver after a transient event or during a transient state. In addition, the present enables a safe transfer of optical data transmission and reception to an alternative or redundant link. These and other advantages of the present invention will become readily apparent from the detailed description of various embodiments below.

DETAILED DESCRIPTION

Figure 1:
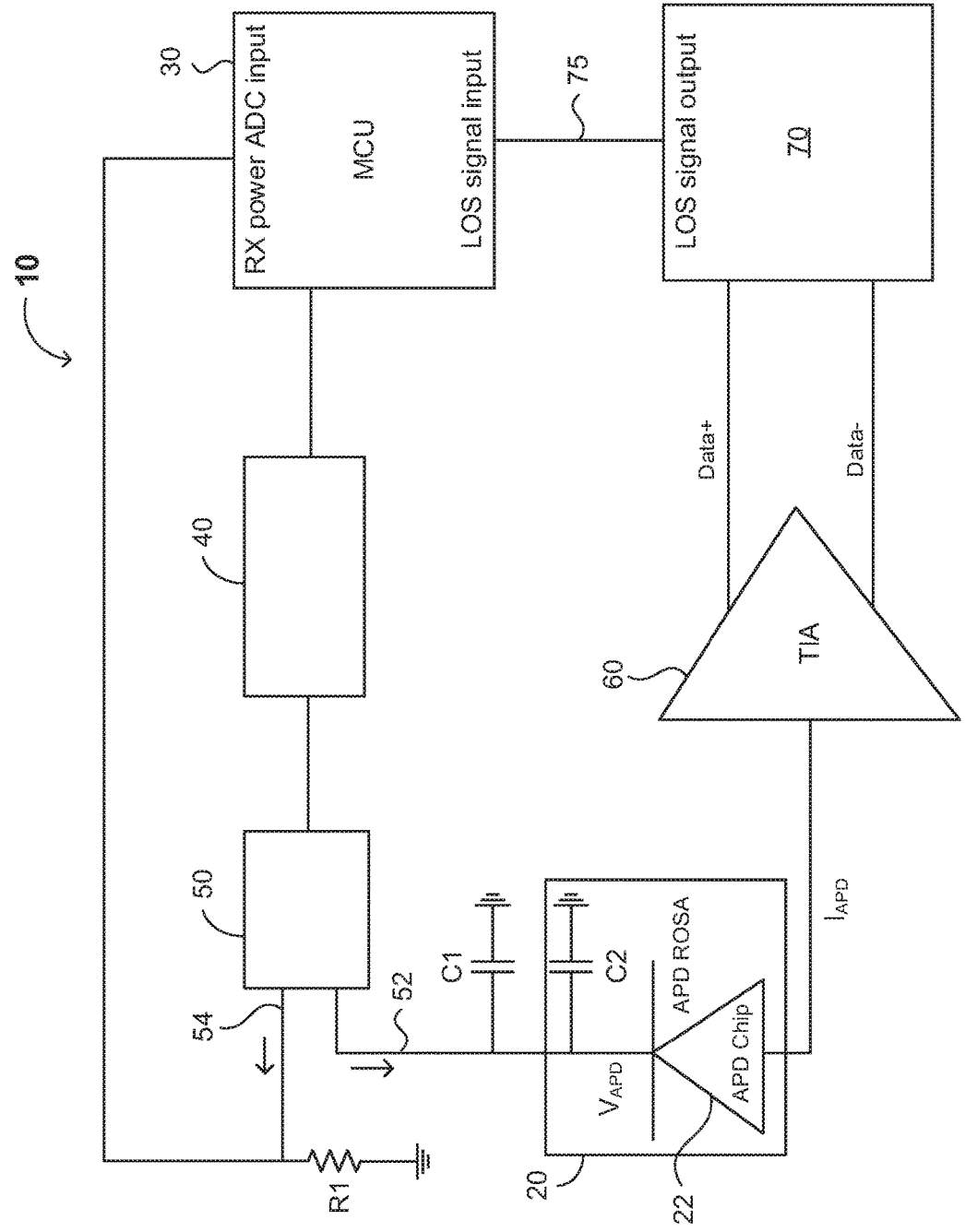
FIG. 1 is a diagram showing a conventional optoelectronic receiver.

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures, components and circuits have not been described in detail so as not to unnecessarily obscure aspects of the disclosure.

Some portions of the detailed descriptions which follow are presented in terms of processes, procedures, logic, functions and other symbolic representations of operations on signals, code, data bits or data streams within a computer, transceiver, processor, controller and/or memory. These descriptions and representations are generally used by those skilled in the data processing arts to effectively convey the substance of their work to others skilled in the art. A process, procedure, logic operation, function, process, etc., is herein, and is generally, considered to be a step or a self-consistent sequence of steps or instructions leading to a desired and/or expected result. The steps generally include physical manipulations of physical quantities. Usually, though not necessarily, these quantities take the form of electrical, magnetic, optical, or quantum signals capable of being stored, transferred, combined, compared, and/or otherwise manipulated in a computer, data processing system, optical component, or circuit. It has proven convenient at times, principally for reasons of common usage, to refer to these signals as bits, streams, values, elements, symbols, characters, terms, numbers, information or the like. It should be borne in mind, however, that all of these and similar terms are associated with the appropriate physical quantities and/or signals, and are merely convenient labels applied to these quantities and/or signals.

Unless specifically stated otherwise, or as will be apparent from the following discussions, it is appreciated that throughout the present application, discussions utilizing terms such as "processing," "operating," "calculating," "determining," or the like, refer to the action and processes of a computer, data processing system, or similar processing device (e.g., an electrical, optical, or quantum computing or processing device or circuit) that manipulates and transforms data represented as physical (e.g., electronic) quantities. The terms refer to actions and processes of the processing devices that manipulate or transform physical quantities within the component(s) of a circuit, system or architecture (e.g., registers, memories, other such information storage, transmission or display devices, etc.) into other data or information similarly represented as physical quantities within other components of the same or a different system or architecture.

Furthermore, in the context of this application, the terms "signal" and "optical signal" refer to any known structure, construction, arrangement, technique, method and/or process for physically transferring data or information from one point to another, electronically, wirelessly, or optically, as the case may be. Also, unless indicated otherwise from the context of its use herein, the terms "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use. Similarly, for convenience and simplicity, the terms "time," "rate," "period" and "frequency" are, in general, interchangeable and may be used interchangeably herein, as are the terms "data," "bits," and "information," but these terms are generally given their art-recognized meanings.

For the sake of convenience and simplicity, the terms "optical" and "optoelectronic" are generally used interchangeably herein, and use of either of these terms also includes the other, unless the context clearly indicates otherwise, but these terms are generally given their art-recognized meanings herein. Furthermore, the term "transceiver" refers to a device having at least one receiver and at least one transmitter, and use of the term "transceiver" also includes the individual terms "receiver" and/or "transmitter," unless the context clearly indicates otherwise. Also, for convenience and simplicity, the terms "connected to," "coupled with," "communicating with," "coupled to," and grammatical variations thereof (which terms also refer to direct and/or indirect relationships between the connected, coupled and/or communicating elements unless the context of the term's use unambiguously indicates otherwise) may be used interchangeably, but these terms are also generally given their art-recognized meanings.

Various embodiments and/or examples disclosed herein may be combined with other embodiments and/or examples, as long as such a combination is not explicitly disclosed herein as being unfavorable, undesirable or disadvantageous. The invention, in its various aspects, will be explained in greater detail below with regard to exemplary embodiments.

An Exemplary Method of Protecting an Optical or Optoelectronic Receiver

An aspect of the present invention involves a method of protecting an optical or optoelectronic receiver, comprising providing a control voltage to the photodetector so that a current flows through the photodetector, and determining that a transient event has occurred or a transient state exists in the optical or optoelectronic receiver. During the transient event or transient state, when the current through the photodetector is at or below a predetermined threshold current, the method maintains the control voltage at a normal operating voltage, and when the current through the photodetector is above the predetermined threshold current, method switches the control voltage to a safe mode voltage. The photodetector may be or comprise a photodiode (e.g., an avalanche photodiode). The present method of protecting an optical or optoelectronic receiver prevents or reduces the probability of excess current in the photodetector (e.g., a photodiode) during initial signal reception and subsequent operation (e.g., following a transient event and/or during a transient state), thereby protecting the optical or optoelectronic receiver.

Figure 3:
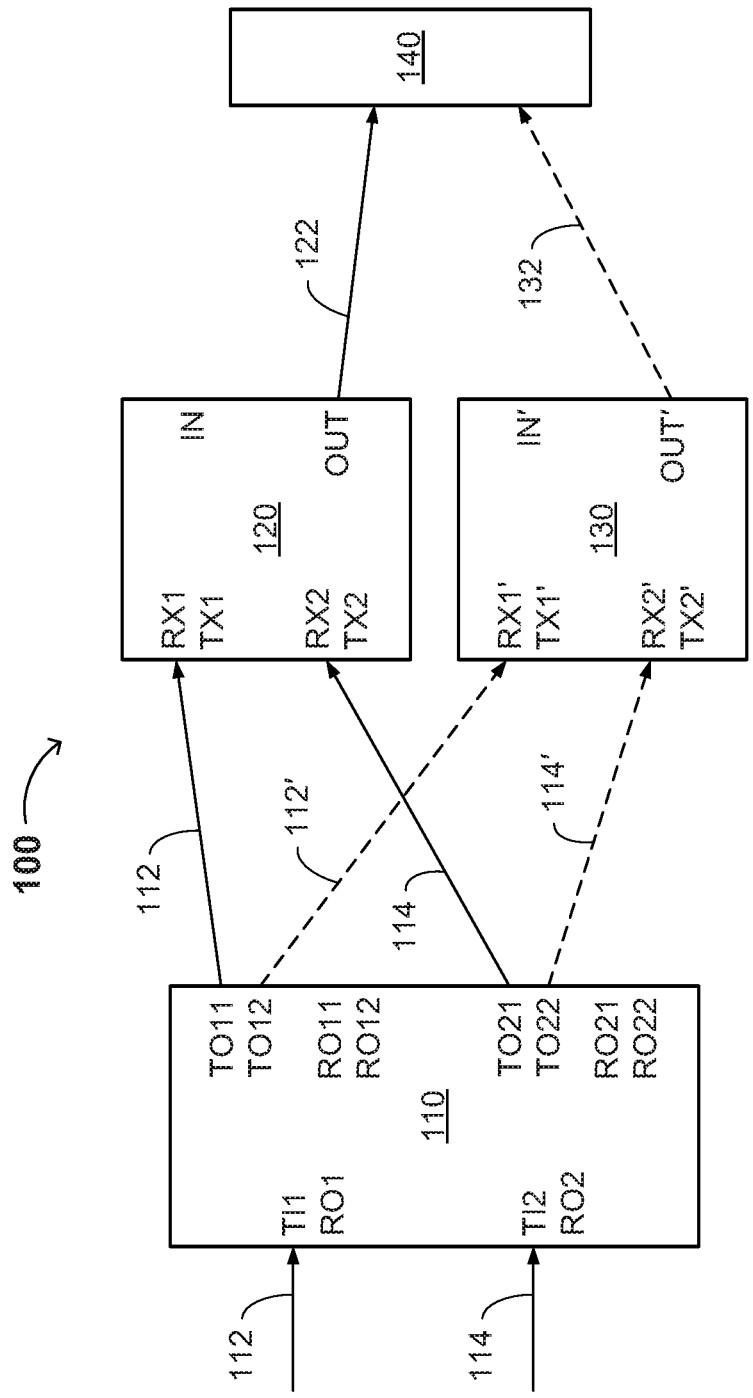
FIG. 3 is a diagram showing exemplary communication paths between components in a system including main and reserved or duplicate optoelectronic transceivers.

The present method protects against current excursions during a transient state by selecting an operational mode of the APD (e.g., safe mode or normal mode), setting a corresponding safe mode threshold current (e.g., $I_{apdthr\_safety}$) or a corresponding normal threshold current (e.g., $I_{apdthr\_normal}$), and regulating and/or maintaining the operational voltage of the APD within the safe mode and normal mode limits. The transient state may occur when switching signal transmission and/or reception from one transmitter to another transmitter, as discussed above with regard to FIG. 3. Alternatively, transient states may arise during or as a result of fiber insertion or extraction tests, or conventional index tests. During such tests, users may ignore the time to switch the control voltage to the photodetector (e.g., $V_{apd}$) to a new value. However, the time taken to switch the photodetector control voltage may influence the time of the operational links in the system to safely become stable and operational (e.g., an operational link generally refers to a link between a transmitter and a receiver in which an error code does not occur in the receiver). Conventional sequential control of the photodetector control voltage may make smooth transitions during such transient events difficult.

Figure 4:
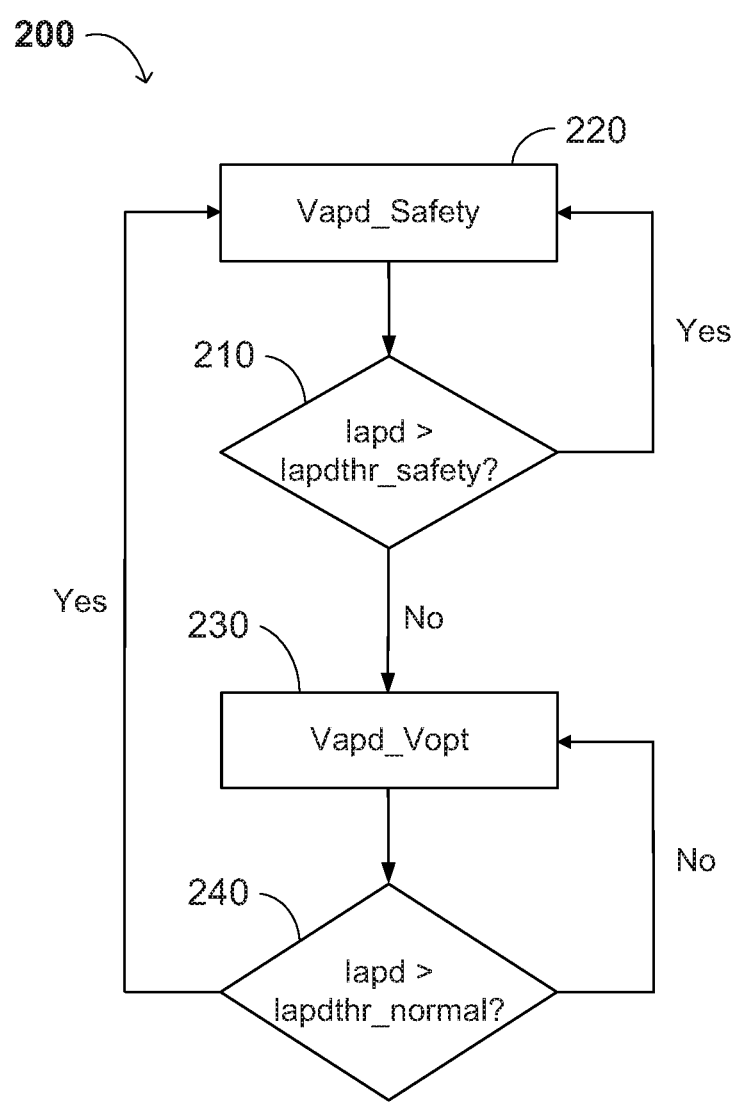
FIG. 4 is a flow chart showing exemplary logic and/or an exemplary algorithm for a method of protecting an optoelectronic receiver in accordance with one or more embodiments of the present invention.

FIG. 4 shows a flow chart 200 for exemplary logic (e.g., an exemplary method or algorithm) for protecting a photodetector, particularly a photodiode, from excessive currents during transient states. The photodetector is in the receiver of an optical or optoelectronic receiver, such as the receivers coupled to the ports RX1' and RX2' in the reserved or duplicate transceiver 130 in FIG. 3. However, the present invention is also applicable to other optoelectronic receivers, such as the receivers coupled to the ports RX1 and RX2 in the main transceiver 120 or to the ports TI1 and TI2 in the network-side transceiver 110, or (to the extent it includes one or more photodetectors) the multiplexer/demultiplexer 140 in FIG. 3. At the beginning of the transient state, the photodetector is presumed to be in the normal operating mode, and the method 200 determines whether the current flowing through the photodetector (e.g., $I_{apd}$) is greater than a predetermined safe mode limit (e.g., $I_{apdthr\_safety}$) at 210.

The safe mode limit may correspond to a current at or under which the photodetector (e.g., a photodiode, such as an avalanche photodiode) is at no risk or substantially no risk of damage. For example, in a typical avalanche photodiode, such a current limit may be between 1.0 and 1.5 mA, or any value or range of values therein (e.g., 1.1 mA). Alternatively, the current limit may correspond to a received optical signal strength at a maximum limit for the photodetector (e.g., 5-10 dBm, or any value or range of values therein). The photodetector may have a gain factor M close to 1 (e.g., from 0.5 to 1.5, or any range of values therein).

In general, at 210, the current through the photodetector (e.g., $I_{apd}$) is measured at a first sampling time or during a first sampling period in the transient period. For example, the transient period may be from 5 ms to 500 ms, or any value or range of values therein (e.g., 25-50 ms), and the sampling time or period may be every 1-100 ms, or any value or range of values therein (e.g., 5-10 ms). The current through the photodetector may be measured periodically during the transient period (e.g., every 1-100 ms, or any value or range of values therein, such as every 5 or 10 ms).

Generally, the current flowing through the photodetector (e.g., $I_{apd}$) cannot be measured directly. Consequently, the current flowing through the photodetector (e.g., $I_{apd}$) may be measured indirectly, for example by measuring a mirrored current that is a duplicate, of the current through the photodetector, a multiple and/or divisor of the current through the photodetector, or a substantial duplicate or multiple and/or divisor of the current through the photodetector. The mirrored current may be from a current mirror that also sources or sinks the current through the photodetector. If the mirrored current is a duplicate or a substantial duplicate of the current through the photodetector, then the mirrored current in measured directly and is presumed to be the same or substantially the same as the current through the photodetector (e.g., $I_{apd}$). If the mirrored current is a multiple or divisor or a substantial multiple or divisor of the current through the photodetector, then the mirrored current in measured, then divided or multiplied by the inverse of the multiple or divisor to obtain, measure, estimate and/or determine the current through the photodetector (e.g., $I_{apd}$).

If the current through the photodetector (e.g., $I_{apd}$) exceeds the safe mode limit (e.g., $I_{apdthr\_safety}$), the control voltage applied to the photodetector is changed at 220 to the safe mode voltage (e.g., $V_{apd\_safe}$). The setting value of the gain factor M may be maintained or reduced.

For example, a typical control voltage to be applied to an optical or optoelectronic photodetector is in the range of 20-30 V. For a typical received including an avalanche photodiode receiving an optical signal having a power of ~5 dBm, the current in the avalanche photodiode will be about 1 mA. However, if as a result of a transient state (e.g., in which a receiver receiving an optical signal from one transmitter switches to another transmitter), the avalanche photodiode receives an optical signal having a power of ~10 dBm, the current in the avalanche photodiode will increase to about 2 mA, which is high enough to damage the avalanche photodiode. In this case, the receiver changes to safe mode, in which case a lower control voltage is applied to the photodetector (e.g., avalanche photodiode). For example, the control voltage in the safe mode may be in the range of 5-15 V (e.g., 10-12 V), which reduces the current in the avalanche photodiode to a safe level.

On the other hand, if the current through the photodetector (e.g., $I_{apd}$) does not exceed the safe mode limit (e.g., $I_{apdthr\_safety}$) at 210, the control voltage applied to the photodetector (e.g., $V_{apd\_}V_{opt}$) is maintained in the normal mode at 230. In this case, the photodetector current is measured again in the normal mode at 240. If the measured current exceeds a predetermined normal mode limit (e.g., $I_{apdthr\_normal}$), the receiver can switch to the safe mode at 220 until the current falls below the safe mode threshold current (e.g., $I_{apdthr\_safety}$), at which time the receiver may be switched to the normal operational mode. In various embodiments, the normal mode current limit may be in the range of 1-1.5 mA, or any value or range of values therein. For example, the normal mode current limit may be the same as or about the same as the safe mode current limit. In addition, conventional power control circuitry and/or software in the receiver may adjust, change or maintain the control voltage applied to the photodetector so that the current through the photodetector eventually falls and stays below the current limit in either mode.

An Exemplary System for Protecting an Optical or Optoelectronic Receiver

Figure 5:
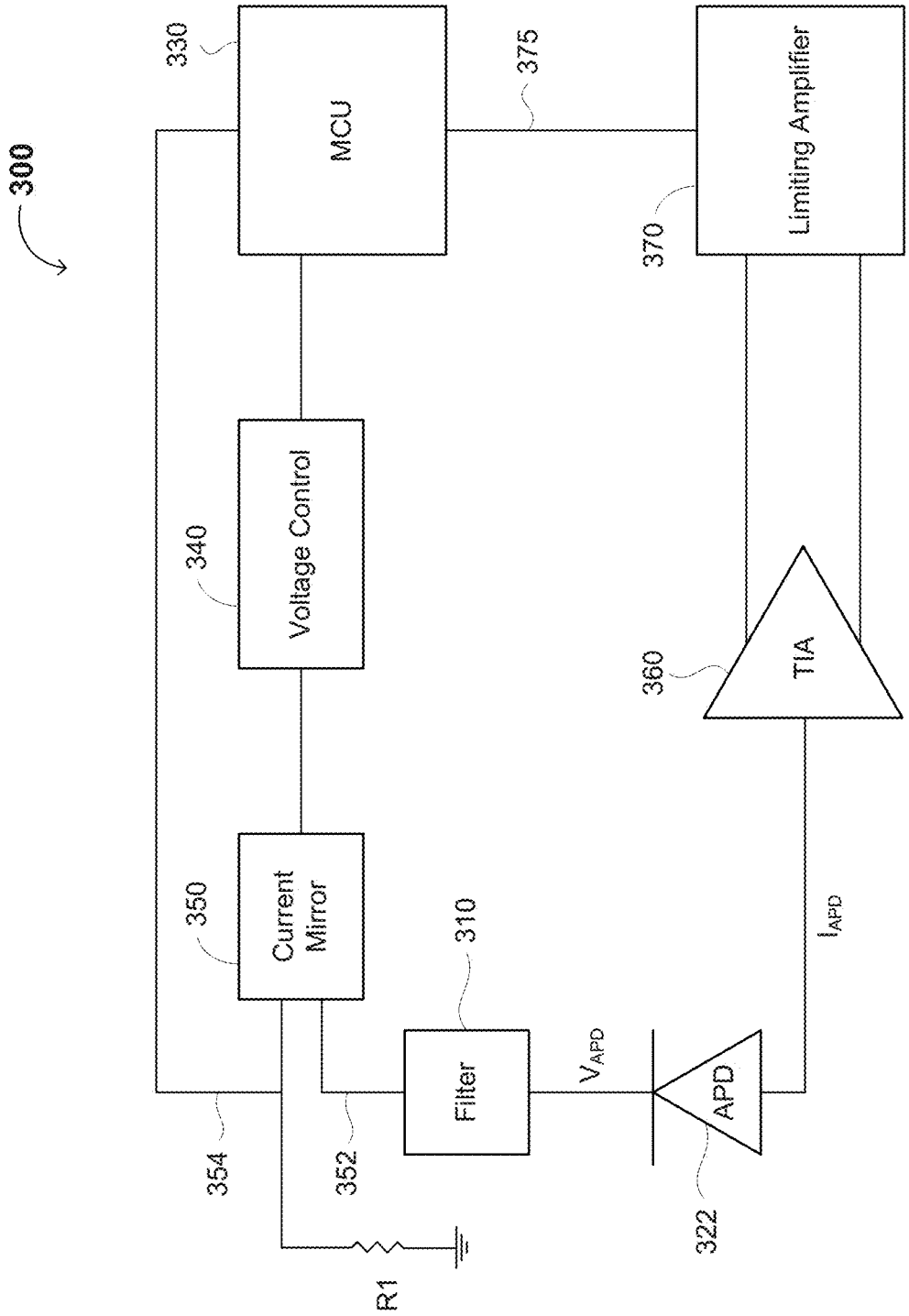
FIG. 5 is a diagram showing an exemplary circuit for protecting an optical or optoelectronic receiver and/or module in accordance with one or more embodiments of the present invention.

FIG. 5 shows an exemplary system 300 for protecting an optical or optoelectronic receiver from excessive currents during transient states. The optical or optoelectronic receiver may be, for example, one or more of the receivers in the reserved or duplicate transceiver 130 (FIG. 3), and optionally, one or more of the receivers in the main transceiver 120 and/or the network-side transceiver 110.

The system 300 includes a photodetector (e.g., avalanche photodiode) 322, a current mirror 350, a voltage control circuit 340, a controller (e.g., MCU) 330, an optional filter 310, a transimpedance amplifier 360, and a limiting amplifier 370. The system 300 controls the voltage $V_{APD}$ to the photodetector 322 depending on the current $I_{APD}$ through the photodetector 322. In particular, the controller 330 instructs the voltage control circuit 340 to set the voltage $V_{APD}$ to the photodetector 322 in response to a mirrored current 354 from the current mirror 350. The mirrored current 354 may be the same as or a multiple or divisor of the current 352, which may be filtered by the filter 310 to provide the voltage $V_{APD}$ to the photodetector 322. Thus, the mirrored current 354 may be substantially the same as or a substantial multiple or divisor of the current $I_{APD}$ through the photodetector 322.

The photodetector 322, current minor 350, transimpedance amplifier 360, and limiting amplifier 370 are substantially the same as in the background technology. However, the controller 330 and voltage control circuit 340 have different functionality, as described herein. The optional filter 310 may comprise one or more capacitors, resistors, and/or switches (e.g., transistors) configured to enable a programmable and/or selectable resistance and/or capacitance.

Figure 2:
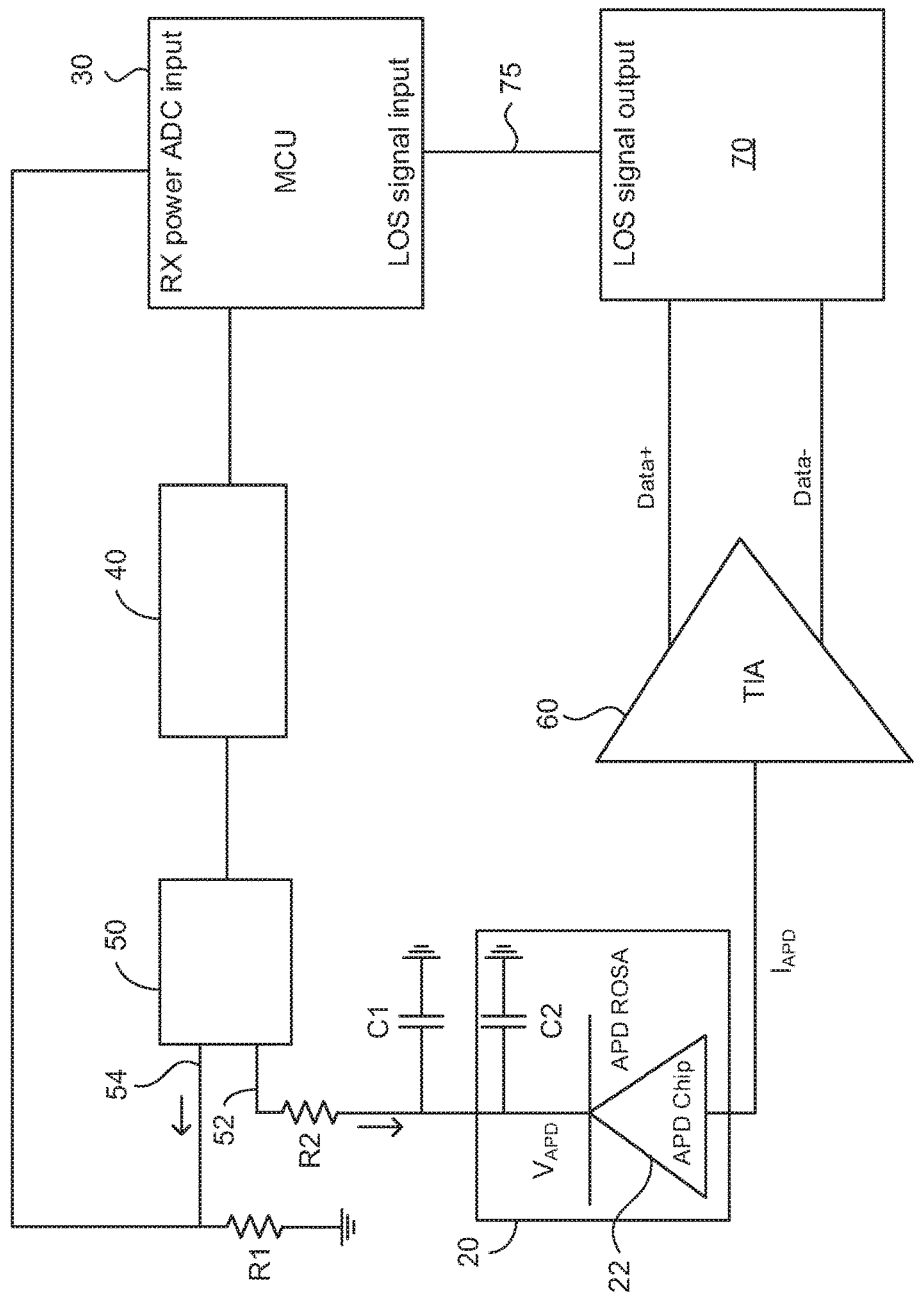
FIG. 2 is a diagram showing an improved conventional optoelectronic receiver.
Figure 6:
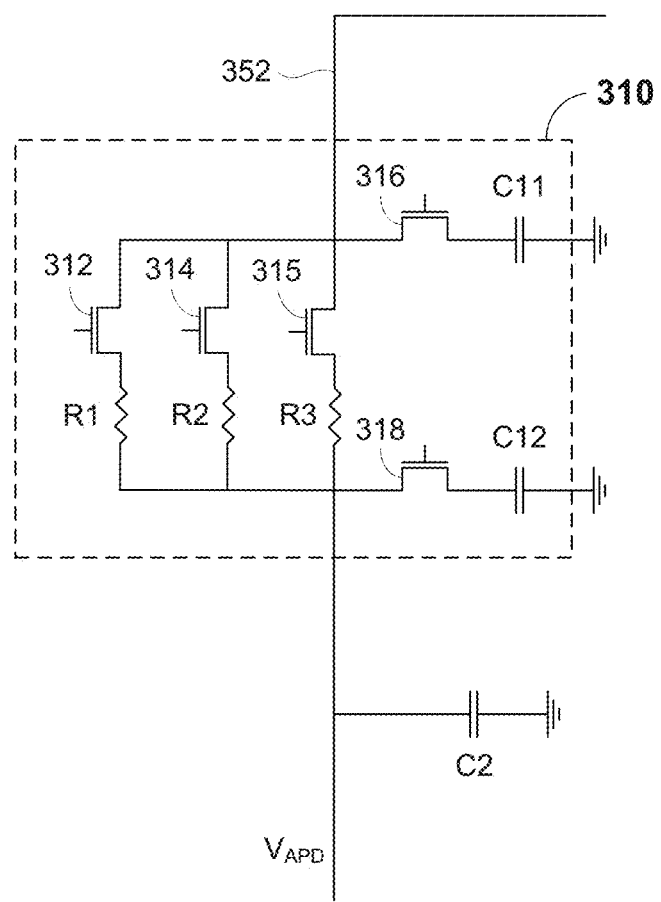
FIG. 6 is a circuit diagram showing an exemplary filter for the protection circuit of FIG. 5 in accordance with one or more embodiments of the present invention.

For example, FIG. 6 shows an exemplary filter 310, comprising first, second and third programmable and/or selectable resistors R1, R2 and R3, and first and second programmable capacitors C11 and C12. Programmable and/or selectable resistors R1, R2 and R3 may be independently switched in or out of the filter 310 by control signals (e.g., from the controller 330 in FIG. 5) applied to transistors 312, 314 and 315, as is known in the art. Each of the resistors R1, R2 and R3 may have a resistance that is the same as or different from that of each of the other resistors. However, in the configuration shown in FIG. 6, at least one of the transistors 312, 314 and 315 is turned on. Alternatively, one of the transistors 312, 314 and 315 may be omitted. Similarly, programmable capacitors C11 and C12 may be independently switched in or out of the filter 310 by control signals (e.g., from the controller 330) applied to transistors 316 and 318, as is known in the art. The fixed capacitor C2 may be similar or identical to capacitor C2 in FIG. 2. The programmable capacitors C11 and C12 may have a capacitance that differs from that of the fixed capacitor C2, as well as from each other.

The operation(s) of the exemplary system 300 of FIG. 5 can be explained by reference to the exemplary waveforms in FIG. 7, in accordance with one or more embodiments of the present invention. Prior to $T_0$, the control voltage applied to the photodetector 322 (e.g., $V_{APD}$) may be at a normal operating level. However, an unexpected event may occur in the optical receiver 300, such as loss of a received signal from a first transmitter. This can result in activation of a loss-of-light indicator signal and/or a loss-of-signal control signal in the receiver (e.g., the signals RXLOL and RXLOS are asserted, or in an active binary logic state). As a result of the unexpected event, a transient state occurs at $T_0$ (e.g., a new signal from a different transmitter is received). Consequently, data from the new transmitter (e.g., the optical data signal RXDDMI) is received at the photodetector 322, and the loss-of-light indicator signal and loss-of-signal control signals (as the case may be) are deactivated. The control voltage applied to the photodetector 322 (e.g., $V_{APD}$) continues to be at the normal operating level.

However, the value of the data signal RXDDMI may be unpredictable at $T_0$. For example, when disabling data reception from one transmitter and enabling data reception from another transmitter (events that can occur simultaneously or substantially simultaneously at $T_0$), the data signal (e.g., RXDDMI*) may be at its maximum or very nearly its maximum at $T_0$ and/or immediately thereafter. In other words, the photodetector 322 may convert the full optical power of the received optical data signal to the corresponding or very nearly the corresponding current at $T_0$ and/or immediately after $T_0$. When the optical power of the received optical data signal exceeds a maximum operational threshold, the corresponding current may be sufficiently high to damage the photodetector 322.

Figure 7A:
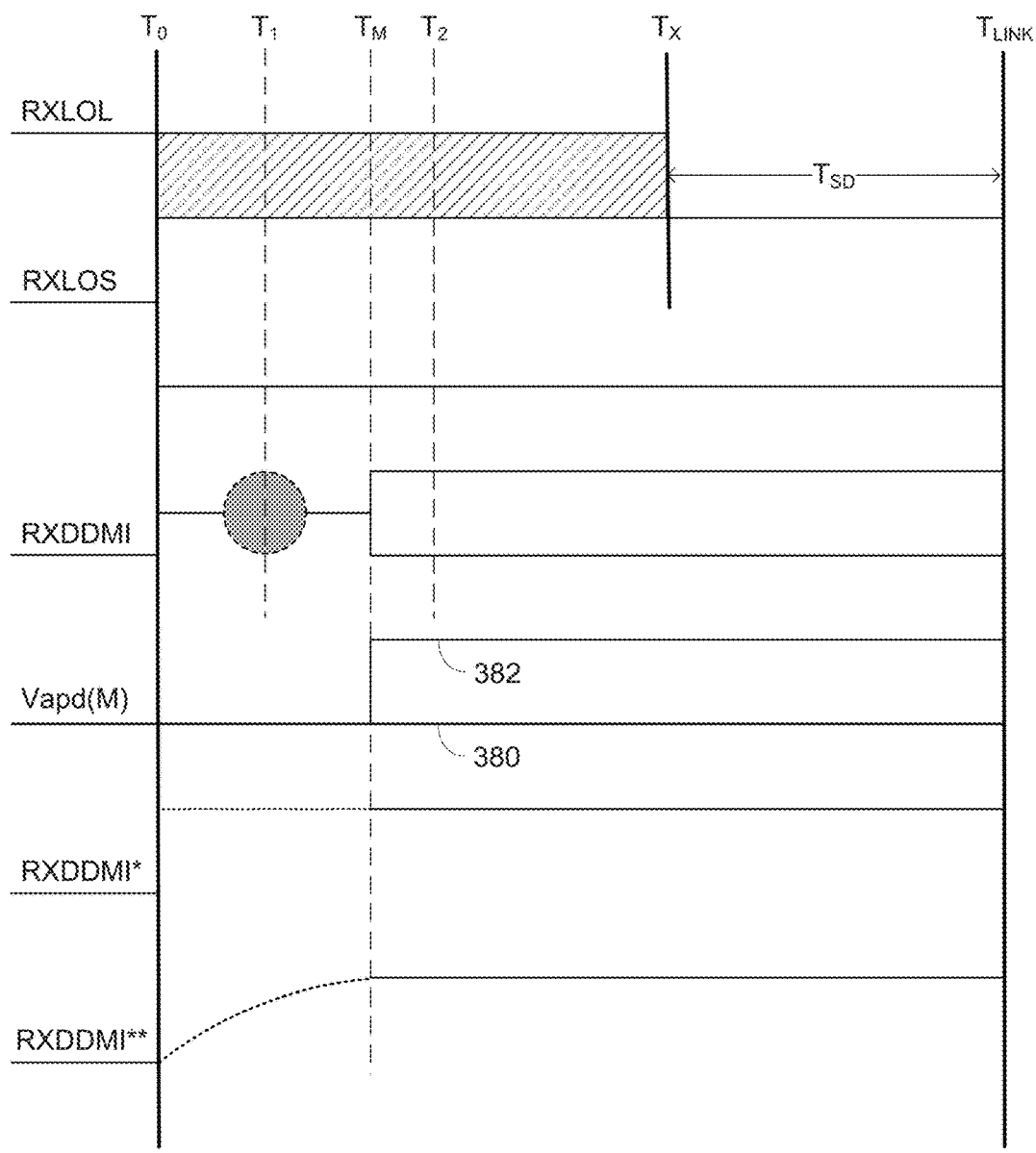
FIGS. 7A-B are timing diagrams showing exemplary waveforms in the exemplary circuit of FIG. 5 in accordance with one or more embodiments of the present invention.
Figure 7B:
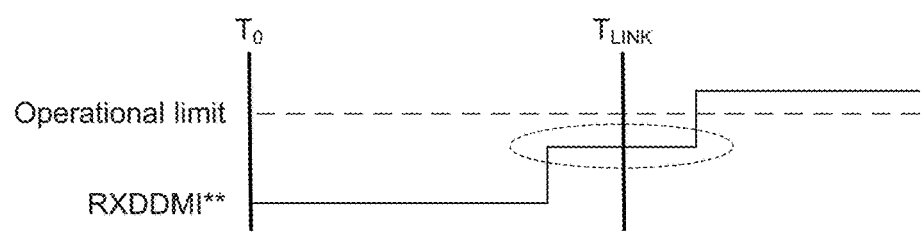

Furthermore, during or as a result of fiber insertion or fiber extraction, the power of any received optical data signal may take a period of time to reach its full/corresponding electrical value (see, e.g., RXDDMI). This period of time can be anywhere from 20-40% of the link transition time (e.g., $T_{LINK}$) to 4-5 times the link transition time. When the power of the received optical data signal is converted to a current that is substantially below the current corresponding to that optical power (e.g., resulting in the electrical data signal RXDDMI having a value or amplitude within normal operating limits at a time when the receiver may begin normal operations, such as $T_{LINK}$; see, e.g., FIG. 7B), the MCU 330 may instruct the voltage control circuit 340 to apply a control voltage (e.g., $V_{APD}$) to the photodetector 322 that can damage the photodetector 322 when the power of the received optical data signal is converted to a current that is at or substantially at the current corresponding to that optical power (e.g., resulting in the electrical data signal RXDDMI** having a value or amplitude in excess of normal operating limits, as shown in FIG. 7B). The present method of controlling or selecting the photodetector control voltage solves such issues, without impacting normal operations of the receiver 300.

Referring back to FIGS. 5 and 7A, at time $T_1$, the controller 330 effectively samples the electrical data signal (e.g., RXDDMI in FIG. 7A). Time $T_1$ is the first point in time after time $T_0$ at which the controller 330 samples the mirrored current 354, which corresponds or substantially corresponds to the value or amplitude of the electrical data signal (e.g., $I_{APD}$ in FIG. 5). The controller 330 may periodically sample the electrical data signal (e.g., the mirrored current 354), without regard to the states of the loss-of-light indicator signal and/or loss-of-signal control signal (e.g., the signals RXLOL and RXLOS in FIG. 7A). The electrical data signal may be sampled every 5-100 ms, for example, or any value or range of values therein (e.g., every 10-20 ms).

At time $T_M$, the controller 330 determines whether the current flowing through the photodetector (e.g., $I_{apd}$) is greater than the safe mode limit (e.g., $I_{apdthr\_safety}$; see, e.g., 210 in FIG. 4). In particular, the controller 330 compares the mirrored current 354 to a stored value corresponding to the safe mode limit. Depending on the sampling rate of the controller 330 and the link transition time, $T_M$ may have a value≥the period at which the controller 330 samples the mirrored current 354, but less than 2-3 times the period at which the controller 330 samples the mirrored current 354.

The photodetector control voltage is kept at the safe mode control voltage (e.g., Vapd_safety) when the receiver is without optical input power (e.g., is not receiving an optical input signal). If the mirrored current 354 is greater than the safe mode limit (e.g., Iapdthr_safety; see 210 in FIG. 4), the photodetector control voltage (e.g., $V_{APD}$) is kept at the safe mode control voltage (Vapd_safety [see 220 in FIG. 4], which may correspond to 380 in FIG. 7A). If the mirrored current 354 is within the range of the safe mode limit, the photodetector control voltage is changed to a control voltage for normal operation (e.g., Vapd_Vopt in FIG. 4, which may correspond to 382 in FIG. 7A). In some examples, the range of safe mode voltages may be defined by a low safe mode limit (e.g., I_safety_low) and a high safe mode limit (e.g., I_safety_high) for the mirrored current 354. The high safe mode limit may be the safe mode threshold current (e.g., Iapdthr_safety).

After changing the photodetector control voltage to the control voltage for normal operation, if the mirrored current 354 is greater than the normal mode limit (Iapdthr_normal; see 240 in FIG. 4), the photodetector control voltage is changed back to the safe mode voltage (e.g., Vapd_safety). In some examples, the range of normal mode voltages may be defined by a low normal mode limit (e.g., I_normal_low) and a high normal mode limit (e.g., I_normal_high) for the mirrored current 354. The range of normal operation mode voltages defined by the normal mode limit(s) may include the range of safe mode voltages defined by the safe mode limit(s). For example, the range [I_safety_low, I_safety high] may always be within (or less than) the range [I_normal_low, I_normal_high].

At substantially the same time (e.g., $T_M$ or as soon as possible thereafter), the controller 330 also determines whether the current flowing through the photodetector is greater than the normal operational mode limit (e.g., $I_{apdthr\_normal}$; see, e.g., 240 in FIG. 4). In particular, the controller 330 compares the mirrored current 354 to a stored value corresponding to the normal operational mode limit. If the mirrored current 354 is not greater than the normal operational mode limit, the photodetector control voltage (e.g., $V_{APD}$) is kept at the control voltage 380 for normal operation (FIG. 7A). If the mirrored current 354 is greater than the normal operational mode limit, the photodetector control voltage is changed to a safe mode control voltage 382. At this point, the electrical data signal should, but may not necessarily, have a value or amplitude sufficient to distinguish between different logic states (e.g., binary or digital logic states).

At time $T_2$, the controller 330 again samples the mirrored current 354 (e.g., equivalent to the electrical data signal RXDDMI in FIG. 7A). Time $T_2$ is the second point in time after time $T_0$ at which the controller 330 samples the mirrored current 354. The controller 330 again performs the method exemplified in FIG. 4 and described herein to compare the mirrored current 354 to the safe mode and normal operational mode limits, and maintain or change the photodetector control voltage $V_{APD}$ accordingly. After the time $T_2$, the electrical data signal RXDDMI generally has a value or amplitude sufficient to distinguish between different logic states, although in some instances, it may take one or more additional cycles of sampling the mirrored current 354 and adjusting or maintaining the photodetector control voltage $V_{APD}$ to achieve this result.

By a time $T_X$ (e.g., the end of the receiver recovery period, FIG. 7A), the electrical data signal generally is stable and may have a value or amplitude sufficient to reduce the data processing error rate to less than a predetermined maximum error rate. For example, the error rate may be bit error rate (or, alternatively, a symbol error rate), and the predetermined maximum error rate may be from 1 to 100 ppm, or any value or range of values therein (e.g., 40 ppm or less, 10 ppm or less, etc.). By $T_X$, the loss-of-light indicator signal (e.g., RXLOL) is generally deasserted. In various implementations, $T_X$ is about 25-75% of $T_{LINK}$, or any value or range of values therein (e.g., 40-60% of $T_{LINK}$).

The remaining time in the link switching time $T_{LINK}$ is the system delay time $T_{SD}$. In effect, the system delay time $T_{SD}$ is a buffer period during which the feedback control circuitry (e.g., the current mirror 350, controller 330 and voltage control circuit 340 in FIG. 5) can stabilize the photodetector control voltage $V_{APD}$. At time $T_{LINK}$, the system conducts normal operations using the data and other signals from the new transmitter.

A further embodiment of the present invention relates to a method of controlling the timing of switching between safe mode and normal mode, and in one particular embodiment, of a protection switch (e.g., in the voltage control circuit 340, FIG. 5) for the photodetector 322. For example, if the system application comprises forward error correction (FEC), a factor M may be determined that ensures that the photodetector 322 works properly and no error code is generated after FEC when an optical signal having a certain input power is received. In such a case, the time at which the photodetector control voltage $V_{apd}$ is switched (e.g., from normal mode to safe mode, or vice versa) will not influence system protection switching.

In the safe mode, the factor M setting relates to the actual design of the optical or optoelectronic module containing the receiver 300. If the predetermined time period for locking the receiver (e.g., $T_{LINK}$) or the time to establish a clock-data recovery (CDR) lock in the receiver can be ignored, the setting of the factor M involves only the establishing the ability to recover and/or correct errors (e.g., by FEC) at the minimum received optical signal strength. Even if the actual receiver lock time or CDR time is relatively long (e.g., longer than $T_{LINK}$), the factor M can be set within the predetermined receiver lock time (e.g., $T_{LINK}$).

On the other hand, if the system does not comprise FEC, the maximum switching time for the photodetector control voltage (e.g., $V_{APD}$) may be set by the system or at the request of a system user. In a typical optoelectronic network application, the maximum switching time may be set to 50 ms or less, and in an optical or optoelectronic module, the maximum switching time may be set to less than 30 ms. After the system switches the link to a given receiver from one transmitter to a new transmitter, the receiver switches $V_{APD}$ to the safe mode value. In the safe mode, application of $V_{APD}$ to the photodiode 322 cannot guarantee that the error rate will be acceptable (e.g., that there is no error code or indicator output by the receiver after processing the data signal), even if the optical power of the received optical signal (e.g., the received optical signal strength) is between the optimal sensitivity point and the overload point. Therefore, the receiver (or module including the receiver) stays in the safe mode until the results from sampling the data signal (e.g., RXDDMI in FIG. 7A) show an acceptable error rate (e.g., no error code or error indicator signals), at which point the receiver switches $V_{APD}$ to its normal mode value (e.g., $V_{OPT}$). If $V_{APD}$ is not switched to its normal mode value within the set maximum switching time (e.g., 50 ms), one or more error codes (e.g., signals indicating an error) remain (e.g., output by the receiver and/or in the system links) until the photodetector control voltage is at its normal mode value within acceptable error limits (e.g., no error code or error indicator signals are generated or output by the receiver). Thus, in systems without FEC, the switching time of $V_{APD}$ (and, optionally, the error rate of the receiver) determines the time for the system to establish the new link.

An Exemplary Optical Transceiver and/or Optical Module

Another aspect of the present invention relates to an optical or optoelectronic transceiver, comprising the present optical or optoelectronic receiver, an optical or optoelectronic transmitter configured to generate an outgoing optical signal, and a second optical subassembly configured to output the outgoing optical signal through the fiber adapter or connector. The present invention may further relate to an optical or optoelectronic module that comprises the present optical or optoelectronic receiver or transceiver, or alternatively, a plurality of the present optical or optoelectronic receivers or transceivers.

Figure 8:
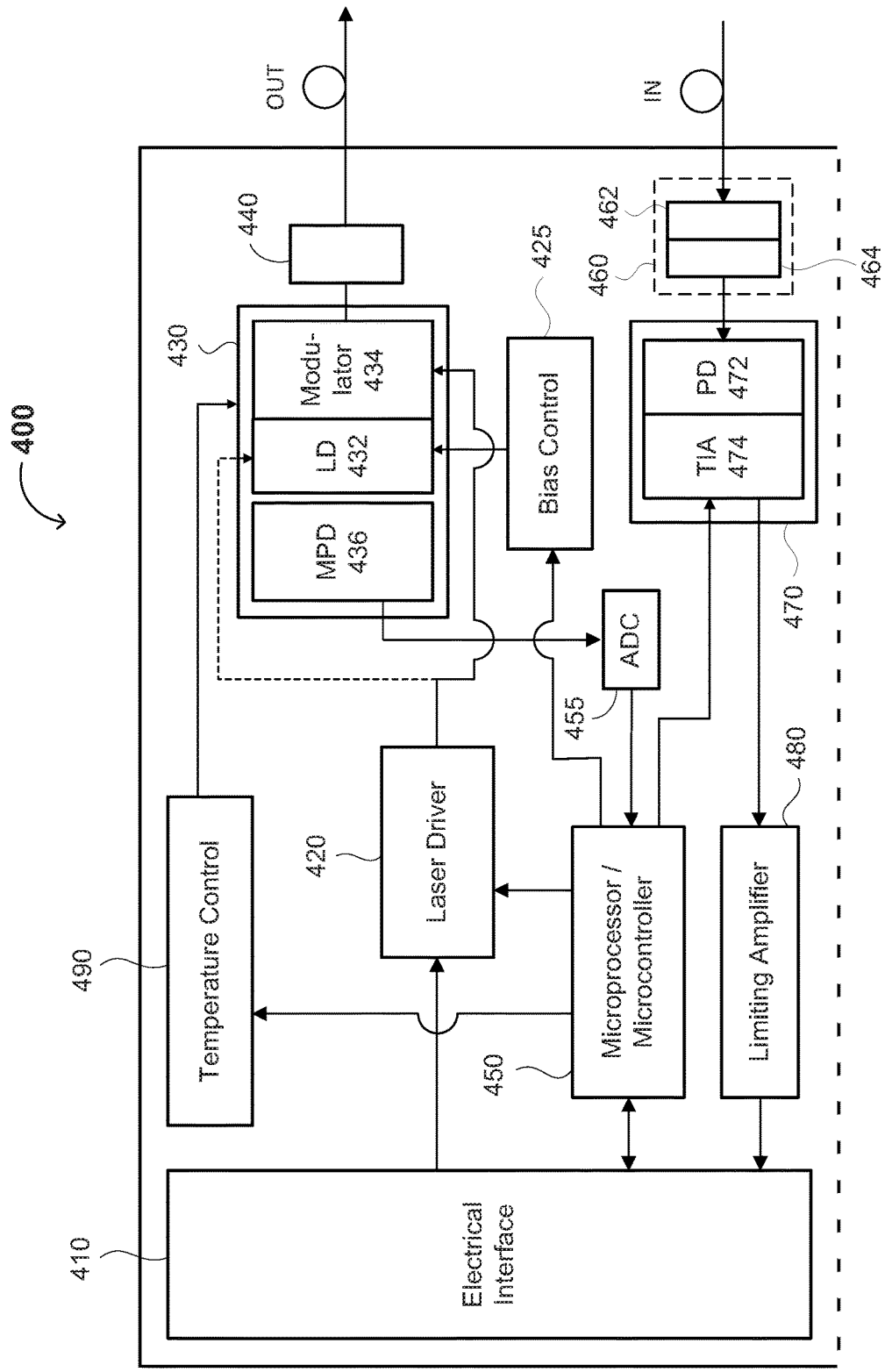
FIG. 8 is a diagram showing components in an exemplary optical or optoelectronic transceiver and/or module in accordance with embodiments of the present invention.

FIG. 8 is a diagram of an exemplary optical transceiver 400 in accordance with embodiments of the present invention comprises an electrical interface 410, one or more laser drivers 420, a transmitter optical subassembly (TOSA) 430, a microprocessor or microcontroller (e.g., MCU) 450, a receiver voltage control circuit 440, a current mirror 460, a receiver optical subassembly (ROSA) 470, a limiting amplifier 480, and a temperature control circuit 490. The transceiver 400 may be or comprise, for example, a combination of a receiver and a transmitter in the reserved or duplicate transceiver 130 (e.g., coupled to ports RX1' and TX 1', RX2' and TX2', or IN' and OUT' in FIG. 3), and optionally, a combination of a receiver and a transmitter in the main transceiver 120 (e.g., coupled to ports RX1 and TX1, RX2 and TX2, or IN and OUT) and/or the network-side transceiver 110 (e.g., coupled to ports TI1 and RO1, or TI2 and RO2). Two (2) such transceivers may be included within a dual transceiver in the network-side transceiver 110 (e.g., coupled to ports TO11, TO12, RO11 and RO12, or to TO21, TO22, RO21 and RO22).

The TOSA 430 comprises a laser diode (LD) 432, a modulator 434 and a monitoring photodiode (MPD) 436. The ROSA 470 generally includes a photodiode (PD) 472 configured to receive an optical signal from a network (e.g., sent over an optical fiber) and convert the optical signal to an electrical signal, and optionally, a transimpedance amplifier (TIA) 474 configured to amplify the electrical signal. The limiting amplifier 480 is configured to amplify the signal received from the ROSA 470.

In the transmitter path of the optical transceiver and/or module 400, the laser driver 420 receives an electrical data signal from the electrical interface 410 and sends a data driving signal or pulse to the modulator 434. The electrical interface 410 may receive the data signal from a host device and may comprise, for example, a conventional golden finger connector. The LD 432 receives a bias signal or voltage from the bias control circuit 425. Alternatively, the LD 432 may receive the data driving signal or pulse directly from the laser driver 420, in which case the modulator 434 may not be needed. The TOSA 430 (i.e., either the modulator 434 or the LD 432) outputs an optical signal through an output port.

The MPD 436 is connected to the MCU 450 via an analog-to-digital converter (ADC) circuit or module 455. Thus, the MCU 450 may receive a digital signal (e.g., a voltage) corresponding to the value of a feedback current from the MPD 436, which may be useful for comparing to one or more thresholds or voltages representative of a target and/or maximum value of the operating range of the laser driver 420. The MPD 436, analog-to-digital converter 455, MCU 450 and laser driver 420 may form an automatic power control (APC) regulating loop for maintaining a target optical output power from the LD 432.

In the receiver path of the optical transceiver and/or module 400, the PD 472 receives the incoming optical signal and converts it into an electrical signal that is amplified by the TIA 474. The amplified electrical signal output by the TIA 474 may then be further amplified by the limiting amplifier 480 prior to transmission through the electrical interface 410 (e.g., to the host). The voltage to the PD 472 from the current minor 460 is controlled by the MCU 450 and the voltage control circuit 440 as described herein.

The MCU 450 also controls the power of the data signal from the laser driver 420, the voltage or current of the bias signal provided by the bias control circuit 425, and the gain(s) of the TIA 474 and/or limiting amplifier 470. The MCU 450 also controls the temperature control circuit 490, which in turn controls the temperature of the LD 432 and optionally the modulator 434. Generally, the temperature of the LD 432 and the modulator 434 may be controlled by regulating the power supplied to them (e.g., when the temperature of the LD 432 is too high, the bias from the bias control circuit may be reduced, and when the temperature of the LD 432 is too low, the bias from the bias control circuit may be increased). The same or different temperature control circuit may control the temperature of the PD 472.

CONCLUSION/SUMMARY

The foregoing descriptions of specific embodiments of the present invention have been presented for purposes of illustration and description. They are not intended to be exhaustive or to limit the invention to the precise forms disclosed, and obviously many modifications and variations are possible in light of the above teachings. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of protecting an optical or optoelectronic photodetector, comprising:
   providing a control voltage to the optical or optoelectronic photodetector so that a current flows through the optical or optoelectronic photodetector;
   determining that a transient event has occurred or a transient state exists in an optical or optoelectronic receiver including the optical or optoelectronic photodetector;
   maintaining the control voltage at a normal operating voltage during the transient event or transient state when the current through the optical or optoelectronic photodetector is at or below a predetermined threshold current; and
   switching the control voltage to a safe mode voltage during the transient event or transient state when the current through the optical or optoelectronic photodetector is above the predetermined threshold current.

2. The method of claim 1, further comprising, after determining that the transient event has occurred or the transient state exists, determining the current through the optical or optoelectronic photodetector.

3. The method of claim 2, wherein determining the current through the optical or optoelectronic photodetector comprises mirroring a current from a current mirror to the optical or optoelectronic photodetector, and sampling the mirrored current.

4. The method of claim 1, wherein the control voltage is switched to a safe mode voltage, and the method further comprises switching the control voltage to the normal operating voltage when the current through the optical or optoelectronic photodetector is at or below the predetermined threshold current.

5. The method of claim 1, wherein the normal operating voltage results in the current through the optical or optoelectronic photodetector being less than or equal to about 1 mA when an optical signal received by the optical or optoelectronic photodetector has a power of 5 dBm or less.

6. The method of claim 1, wherein the safe mode voltage is less than or equal to half of the normal operating voltage.

7. The method of claim 1, wherein the predetermined threshold current is less than or equal to 1.2 mA.

8. The method of claim 1, wherein the optical or optoelectronic photodetector comprises an avalanche photodiode.

9. An optical or optoelectronic receiver, comprising:
   an optical or optoelectronic photodetector having a current therethrough;
   a current minor coupled to the current through the optical or optoelectronic photodetector, providing a mirrored current corresponding to the current through the optical or optoelectronic photodetector, and receiving a control voltage;
   a voltage control circuit configured to provide the control voltage to the current mirror; and
   a controller coupled to the voltage control circuit and configured to (i) determine a value of the mirrored current and (ii) after a transient event has occurred or a transient state exists in the optical or optoelectronic receiver, select (a) a first value of the control voltage when the mirrored current is at or below a predetermined threshold current and (b) a second value of the control voltage when the mirrored current is above the predetermined threshold current, the second value being less than the first value.

10. The optical or optoelectronic receiver of claim 9, wherein the optical or optoelectronic photodetector comprises an avalanche photodiode.

11. The optical or optoelectronic receiver of claim 9, wherein the mirrored current is a duplicate or a multiple and/or divisor of the current through the optical or optoelectronic photodetector, or a substantial duplicate or multiple and/or divisor of the current through the optical or optoelectronic photodetector.

12. The optical or optoelectronic receiver of claim 9, further comprising a filter connected between the current minor and the optical or optoelectronic photodetector.

13. The optical or optoelectronic receiver of claim 9, wherein the controller samples the mirrored current and compares the value of the mirrored current to the predetermined threshold value.

14. The optical or optoelectronic receiver of claim 9, wherein the second value is less than or equal to half of the first value.

15. The optical or optoelectronic receiver of claim 9, wherein the first value results in the current through the optical or optoelectronic photodetector being less than or equal to about 1 mA when an optical signal received by the optical or optoelectronic photodetector has a power of 5 dBm or less.

16. The optical or optoelectronic receiver of claim 9, wherein the predetermined threshold value is less than or equal to 1.2 mA.

17. The optical or optoelectronic receiver of claim 9, wherein the controller is configured to instruct the voltage control circuit to output a signal having or corresponding to the first or second value.

18. The optical or optoelectronic receiver of claim 9, wherein when the control voltage is the second value, the controller is further configured switch the control voltage to the first value when the mirrored current is at or below the predetermined threshold current.

19. An optical or optoelectronic transceiver, comprising:
   the optical or optoelectronic receiver of claim 9, receiving an incoming optical signal;
   an optical or optoelectronic transmitter configured to generate an outgoing optical signal; and
   a fiber adapter or connector configured to receive an optical fiber, the optical fiber providing the incoming optical signal and/or receiving the outgoing optical signal.

20. An optical or optoelectronic system, comprising a plurality of the optical or optoelectronic transceivers of claim 19.

* * * * *